US006083102A

United States Patent [19]

Pfeiffer et al.

[11] Patent Number: 6,083,102

[45] Date of Patent: Jul. 4, 2000

[54] VARIABLE SWEEP HELICAL INFEED ELEMENT

[75] Inventors: Dohn William Pfeiffer, Davenport; Raymond Manford Andes, Bettendorf, both of Iowa

[73] Assignee: Deere & Company, Moline, Ill.

[21] Appl. No.: 09/231,919

[22] Filed: Jan. 14, 1999

[51] Int. Cl.[7] .............................. A01F 12/00; A01F 12/10

[52] U.S. Cl. .............................. 460/68

[58] Field of Search .............................. 460/66, 68, 67, 460/69, 70, 75, 80, 90; 198/676, 677

[56] References Cited

U.S. PATENT DOCUMENTS

| | | | |
|---|---|---|---|
| 3,481,343 | 12/1969 | Buskirk | 460/66 |
| 3,664,100 | 5/1972 | Rowland-Hill | 460/66 |
| 3,848,609 | 11/1974 | Mortier et al. | 460/66 |
| 4,148,323 | 4/1979 | McMillen et al. . | |
| 4,178,943 | 12/1979 | West . | |
| 4,230,130 | 10/1980 | Staiert | 460/69 |
| 4,291,709 | 9/1981 | Weber et al. . | |
| 4,440,179 | 4/1984 | Bassett et al. . | |
| 4,964,838 | 10/1990 | Cromheecke et al. . | |
| 5,145,462 | 9/1992 | Tanis et al. . | |
| 5,344,367 | 9/1994 | Gerber . | |
| 5,364,306 | 11/1994 | Soots et al. . | |
| 5,387,153 | 2/1995 | Tanis . | |
| 5,413,531 | 5/1995 | Tanis . | |

*Primary Examiner*—David Bagnell
*Assistant Examiner*—Meredith C. Petravick

[57] ABSTRACT

A variable sweep infeed element for a rotary combine is bolted to the infeed section of the rotor drum and extends radially outward therefrom. The element is provided with a forward portion and a rearward portion. The forward portion is the location where the infeed element first contacts the crop mat. The forward portion has a radial section that extending radially outward from the rotor drum and an outermost section is forward swept in the direction of rotor rotation. This forward sweep is most aggressive at the initial feeding point and becomes less aggressive as the forward portion extends longitudinally downstream towards the transition point between the forward portion and the rearward portion. The rearward portion is provided with a radial section extending radially outward from the rotor drum and an outermost.

12 Claims, 2 Drawing Sheets

42
52
62
54
52
42
60
52
50
52
58
49
41
66
52
68
50

50
50
49
42
52
58
66
68
52
54
41
60
62
52
52
52
42

VARIABLE SWEEP HELICAL INFEED ELEMENT

BACKGROUND OF THE INVENTION

1. Field of the Invention

The invention is directed to a variable sweep infeed element for a rotary combine having a forward portion that is provided with a forward swept section and a rearward portion that is provided with a rearward swept section.

2. Description of the Prior Art

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

Rotary combines have one or two large rotors arranged along the longitudinal axis of the machine for threshing and separating the harvested crop material. These rotors are provided with an infeed section for receiving harvested crop material, a threshing section for threshing the harvested crop material received from the infeed section and a separating section for freeing grain trapped in the threshed crop material received from the threshing section.

The harvested crop is delivered to the infeed section by the feederhouse. The crop is arranged in a crop mat which the infeed elements of the rotor need to take up and rotate into a helical flow. Previously, feeding elements have been arranged with a continuous sweep angle along the length of the element, or these infeed elements are rearward swept at the initial point of contact with the crop mat and proceed to forward swept as the element extends downstream in the longitudinal direction.

These basic designs are used on all axially arranged rotary combines currently being marketed. A common problem for these machines is their difficulty in feeding tough, damp or green crop material as well as short, dry or slick crop material with the same infeed element geometry. This difficulty limits machine throughput and causes the operator to significantly reduce the amount of material that is fed to the rotary crop processing assemblies.

SUMMARY

It is an object of the present invention to provide a variable sweep infeed element for a rotary combine which improves material feeding and flow into the rotary crop processing assemblies.

The helical infeed element of the present invention is a helical element bolted to the infeed section of the rotor drum and extends radially outward therefrom. The element is provided with a forward portion and a rearward portion. The forward portion is the location where the infeed element first contacts the crop mat. The forward portion has a radial section that extending radially outward from the rotor drum and an outermost section is forward swept in the direction of rotor rotation. This forward sweep is most aggressive at the initial feeding point and becomes less aggressive as the forward portion extends longitudinally downstream towards the transition point between the forward portion and the rearward portion. The rearward portion is provided with a radial section extending radially outward from the rotor drum and an outermost section which is backswept away from the direction of rotor rotation.

DETAILED DESCRIPTION

Figure 1:
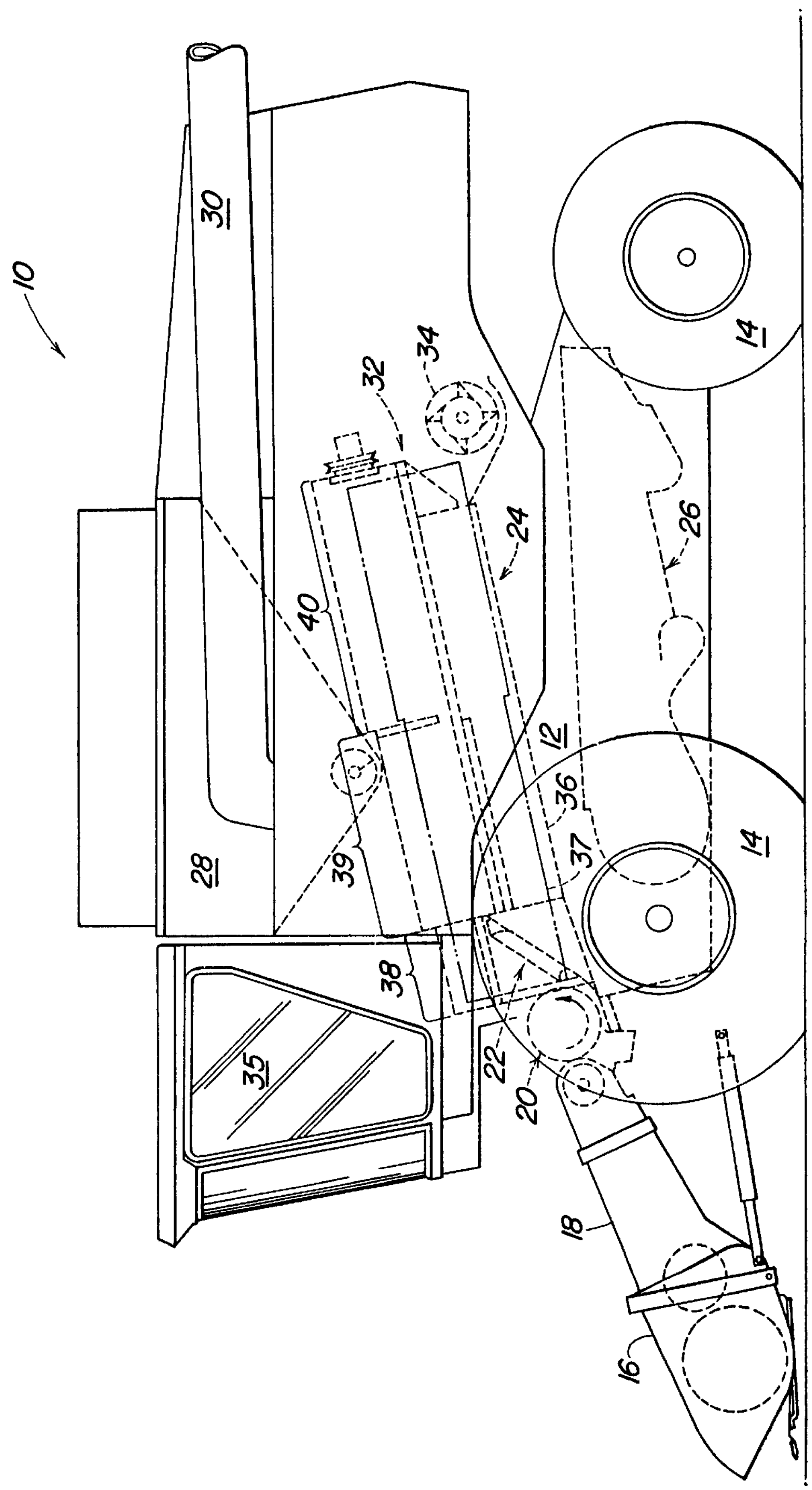
FIG. 1 is a side view of a rotary agricultural combine.

FIG. 1 shows an agricultural combine 10 comprising a supporting structure 12 having ground engaging wheels 14 extending from the supporting structure. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit threshes and separates the harvested crop material. Grain and chaff fall through grates on the bottom of the unit 24 to cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw is discharged from the axial crop processing unit through outlet 32 to discharge beater 34. The discharge beater in turn propels the straw out the rear of the combine. The operation of the combine is controlled from operator's cab 35.

The axial crop processing unit comprises a cylindrical rotor housing 36 and a rotor 37 located inside the housing 36. The front part of the rotor and the rotor housing define the infeed section 38 of the crop processing unit. Longitudinally downstream from the infeed section 38 are threshing section 39 and separating section 40. The rotor in the infeed section is provided with a conical rotor drum 41 having helical infeed elements 42 for engaging harvested crop material received from the beater 20 and inlet transition section 22. Immediately downstream from the infeed section is the threshing section 39 of the crop processing unit 24. In the threshing section 39 the rotor comprises a cylindrical rotor drum 49 having a number of threshing elements 50 for threshing the harvested crop material received from the infeed section 38. Downstream from the threshing section 39 is the separating section 40 wherein the grain trapped in the crop material is released and falls through the grate to the cleaning system 28.

Figure 2:
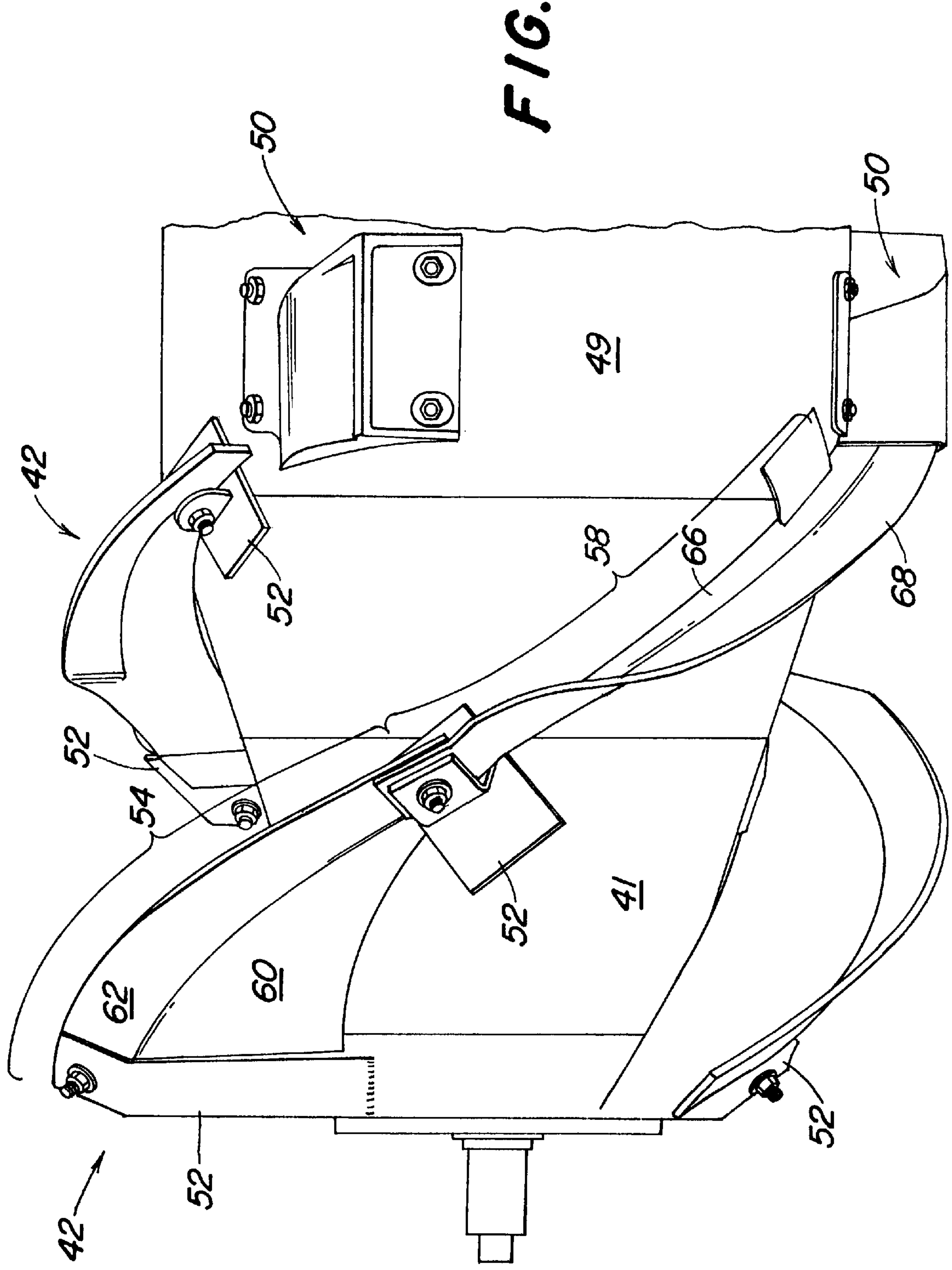
FIG. 2 is a side view of the infeed section of the rotor.

The infeed elements are best illustrated in FIG. 2. The infeed elements 42 are bolted to conical rotor drum 41 by mounting assemblies 52. The infeed elements 42 are provided with a forward portion 54 and a rearward portion 58. The forward portion is provided with a radially extending section 60 and an outermost section 62 that is forwardly swept in the direction of rotation. Similarly the rearward section 58 is provided with an outwardly extending radial section 66 and an outermost rearward swept section 68.

The outermost section 62 of the forward portion 54 initially engages the crop mat in a very aggressive manner cupping and engaging the crop material to quickly transition it into a helical flow. The forward swept portion extends longitudinally downstream to a lessening degree until the helical flow of the crop material is fully established. As the infeed element transitions inwardly in a radial direction the forward portion 54 transitions into the radially extending section 60. In this way the forward portion provides a means of aggressively engaging the crop mat but not allowing the crop mat to penetrate to deeply towards the rotating drum and accumulating non-uniformly between the infeed elements 42.

The outermost portion 68 of the rearward portion 58 is back swept away from the direction of rotation to release the crop material and smear it outward towards the rotor casing thereby evenly distributing the crop material between the infeed elements. This provides a means of allowing the radial inner crop material to continue flowing in a helical path driven by the infeed element 42. The crop material can easily transition outward over the back swept outermost portion to provide a uniform helical distribution of crop material flow between the infeed element 42 and the rotor housing 36.

The invention should not be limited by the above described embodiments, but should be limited solely by the claims that follow:

What is claimed is:

1. A crop processing rotor for a rotary agricultural combine, comprising:

a drum, having an infeed section for receiving harvested crop material, a threshing section for threshing the harvested crop material from the infeed section, and a separating section for separating grain from the threshed crop material received from the threshing section, the drum having a direction of rotation; and helical infeed elements mounted to the infeed section of the cylindrical drum, the helical infeed elements have a forward portion that first engages harvested crop material and a rearward portion adjacent to the threshing section, the forward portions of the infeed elements is provided with a radial section extending radially outward from the drum and an outermost section that is forwardly swept towards the direction of rotation.

2. A crop processing rotor as defined by claim 1 wherein the rearward portion of each helical infeed element is provided with a radial section extending radially outward from the drum and an outermost section that is rearward swept away from the direction of rotation.

3. A crop processing rotor as defined by claim 2 wherein the drum in the infeed section is conical.

4. A crop processing rotor as defined by claim 3 wherein the helical infeed elements are bolted to the drum by a mounting assembly.

5. A crop processing rotor as defined by claim 1 wherein the drum in the infeed section is conical.

6. A crop processing rotor as defined by claim 5 wherein the helical infeed elements are bolted to the drum by a mounting assembly.

7. A crop processing rotor for a rotary agricultural combine, comprising:

a cylindrical drum, having an infeed section for receiving harvested crop material, a threshing section for threshing the harvested crop material from the infeed section, a separating section for separating grain from the threshed crop material received from the threshing section and a direction of rotation; and helical infeed elements are mounted to the infeed section of the cylindrical drum, the helical infeed elements have a forward portion that first engages harvested crop material and a rearward portion adjacent to the threshing section, the rearward portions of the helical infeed elements is provided with a radial section extending radially outward from the cylindrical drum and an outermost section that is rearward swept away from the direction of rotation.

8. A crop processing rotor as defined by claim 7 wherein the drum in the infeed section is conical.

9. A crop processing rotor as defined by claim 8 wherein the helical infeed elements are bolted to the drum by a mounting assembly.

10. A rotary combine for harvesting, threshing and separating an agricultural crop, said combine comprising;

a supporting structure;

ground engaging means extending from the supporting structure for transporting the supporting structure across a field;

an axial rotor housing located inside the supporting structure, the rotor housing is provided with an infeed section for introducing crop into the housing, a threshing section for threshing grain from harvested crop material and a separating section for separating grain from the threshed crop material;

an axial rotor located in the rotor housing having an infeed section, a threshing section and a separating section corresponding to the infeed, threshing and separating sections of the axial rotor housing, the rotor has a direction of rotation, wherein the infeed section of the rotor is provided with helical infeed elements, the helical infeed elements have a forward portion that first engages harvested crop material and a rearward portion adjacent to the threshing section, the forward portions of the infeed elements is provided with a radial section extending radially outward from the drum and an outermost section that is forwardly swept towards the direction of rotation, wherein the rearward portion of each helical infeed element is provided with a radial section extending radially outward from the drum and an outermost section that is rearward swept away from the direction of rotation.

11. An rotary combine as defined by claim 10 wherein the drum in the infeed section is conical and the drum in the threshing and separating sections is cylindrical.

12. An rotary combine as defined by claim 11 wherein the helical infeed elements are bolted to the drum by a mounting assembly.

* * * * *